(12) United States Patent
Ohrbom et al.

(10) Patent No.: US 6,838,530 B2
(45) Date of Patent: Jan. 4, 2005

(54) METHOD OF PREPARING VARIOUS MULTIFUNCTIONAL MATERIALS USING LIMITED STARTING REACTANTS

(75) Inventors: Walter H. Ohrbom, Hartland Township, MI (US); Patricia A. Herrel, Hartland Township, MI (US)

(73) Assignee: BASF Corporation, Southfield, MI (US)

( * ) Notice: Subject to any disclaimer, the term of this patent is extended or adjusted under 35 U.S.C. 154(b) by 10 days.

(21) Appl. No.: 10/325,328

(22) Filed: Dec. 20, 2002

(65) Prior Publication Data

US 2003/0125470 A1 Jul. 3, 2003

Related U.S. Application Data

(63) Continuation-in-part of application No. 09/998,365, filed on Nov. 29, 2001, now abandoned.

(51) Int. Cl.$^7$ .............................. C08F 8/30; C08F 8/32
(52) U.S. Cl. ................ 525/498; 525/329.9; 525/327.2; 525/374; 525/375; 525/377; 525/378; 525/278
(58) Field of Search ............................ 525/498, 329.9, 525/332.7, 374, 375, 377, 378, 278, 533

(56) References Cited

U.S. PATENT DOCUMENTS

| | | | |
|---|---|---|---|
| 4,758,632 A | 7/1988 | Parekh et al. | |
| 4,882,391 A | 11/1989 | Brindopke et al. | ...... 525/327.2 |
| 5,187,229 A | 2/1993 | Yamamoto et al. | |
| 5,508,379 A | 4/1996 | Menovcik et al. | |
| 5,907,024 A | 5/1999 | Ohrbom et al. | |
| 5,945,499 A | 8/1999 | Ohrbom et al. | |
| 6,106,951 A | 8/2000 | Ohrbom et al. | |
| 6,262,297 B1 | 7/2001 | Clements et al. | |
| 6,376,616 B1 | 4/2002 | December | ................... 525/278 |
| 2003/0134986 A1 | 7/2003 | Ohrbom et al. | |

FOREIGN PATENT DOCUMENTS

| | | | |
|---|---|---|---|
| DE | 2 293 454 | 12/1974 | ........... C08G/71/04 |
| DE | 41 29 752 | 3/1993 | |
| DE | 41 29 753 | 3/1993 | |
| EP | 0 380 146 | 6/1986 | |
| EP | 0 274 721 | 12/1987 | ............. C08F/8/32 |
| GB | 1 095 485 | 12/1967 | ........... C08G/21/02 |
| WO | WO 97/23516 | 7/1997 | ............. C08F/8/32 |
| WO | WO 98/12233 | 3/1998 | ............. C08F/4/06 |
| WO | WO 98/50345 | 11/1998 | ......... C07C/269/04 |
| WO | WO 00/71505 | 11/2000 | |
| WO | WO 01/49749 | 7/2001 | |
| WO | WO 03/060025 | 7/2003 | |
| WO | WO 03/060026 | 7/2003 | |

OTHER PUBLICATIONS

Notification of Transmittal of the International Search Report of the Declaration for PCT/US03/33976, International Filing Date Oct. 24, 2003.
International Search Report for PCT/US03/33976, International Filing Date Oct. 24, 2003.
English Language Abstract for EP 0 380 146, Jan. 8, 1987.
International Search Report for BASF Corporation, PCT/US 03/33975, filed Jan. 24, 2003.
International Search Report for BASF Corporation, PCT/US 03/34335, filed Oct. 29, 2003.
English Abstract for DE 41 29 753 from EPO, Mar. 11, 1993.
English Abstract for DE 41 29 752 from EPO, Mar. 11, 1993.

*Primary Examiner*—James J. Seidleck
*Assistant Examiner*—Olga Asinovsky

(57) ABSTRACT

The invention provides a method of making a number of different multifunctional acrylic materials from a limited number of starting materials. The method of the invention requires the product of a masterbatch of an acrylic oligomer or polymer having two or more cyclic carbonate functional groups. A first portion of the masterbatch is then reacted with ammonia and a grafting material (c) in either successive or simultaneous reactions to provide a first multifunctional acrylic oligomer or polymer. Additional portions of the masterbatch may be reacted with ammonia and other grafting materials (c), different from the first grafting material (c), in either successive or simultaneous reactions to provide different multifunctional acrylic oligomers or polymers.

17 Claims, No Drawings

METHOD OF PREPARING VARIOUS MULTIFUNCTIONAL MATERIALS USING LIMITED STARTING REACTANTS

This application is a continuation-in-part of U.S. application Ser. No. 09/998,365, filed Nov. 29, 2001, now abandoned.

FIELD OF THE INVENTION

The invention relates to methods of making thermosetting multifunctional materials, especially those materials comprising at least one primary carbamate group and most particularly to multifunctional materials comprising at least one β or higher-hydroxy primary carbamate functional group.

BACKGROUND OF THE INVENTION

Graft polymers have been known for use in the coatings industry as binders for thermosetting compositions. Graft polymer binders typically have a plurality of functional sites reactive with the functional sites of one or more crosslinking agents and upon cure, produce hard, durable, glossy films suitable for use in a variety of coating applications. Preferred applications include automotive primers, basecoats, and clearcoats. Such coatings may be waterborne, solventborne, powder, or combinations thereof.

The manufacture of graft polymers has typically involved the production of a base material having one or more functional sites per molecule. At least one of these functional sites must be capable of subsequent or concurrent reaction with at least one functional group of a graft moiety.

Graft copolymerization processes have traditionally been used to incorporate moieties that cannot be incorporated during the preparation of the base material. Examples of such moieties include polymers such as polyesters, polyurethanes and the like, surfactants, halogenated compounds, certain water dispersible groups such as nonionic groups, simple alkyl groups, functional groups such as beta- and higher hydroxy primary carbamate groups, including gamma-hydroxy primary carbamate groups, delta-hydroxy primary carbamate groups, and the like, the derivatives thereof, acid functional materials, epoxy functional materials, silane functional materials, siloxane functional materials and the like.

However, numerous problems occur during such prior art graft reaction processes. In particular, in the processes of the prior art, the reaction of the graft moiety and the base material results in reaction products which are reactive with one or more species, including the base material, other intermediate species, and/or the graft moiety. Such undesirable side reactions result in uncontrolled molecular weight growth, the loss of desired functionality, and/or gelation.

In addition, the uncontrollable reactivity of the functional group used as the grafting site on the base material can often limit the use of additional functionality on the base material and hinder the production of multifunctional graft materials. As a result, it has been difficult to obtain certain multifunctional graft materials using the processes of the prior art.

For example, if an epoxy group is used as the grafting site on an acrylic backbone, ethylenically unsaturated monomers having functional groups reactive with epoxy must be avoided during the polymerization of the acrylic backbone if the epoxy group results from the use of an ethylenically unsaturated monomer such as glycidyl methacrylate. Illustrative functional groups that would have to be avoided include active hydrogen containing groups such as amine functional ethylenically unsaturated monomers, acid functional ethylenically unsaturated monomers, and depending, on the polymerization conditions, hydroxy containing ethylenically unsaturated monomers.

Assuming that an acrylic backbone polymer's functionality is limited to epoxy groups, the use of amine, hydroxy, or acid functional graft moieties will result in a variety of intermediate species which are reactive with the graft moiety, the epoxy functionality of the acrylic backbone or both. As a result, attempts to use an amine or acid functional graft moiety will often lead to uncontrolled molecular weight growth, the loss of desired functionality on the backbone, and/or gelation.

Moreover, it would be advantageous to obtain graft materials with the aforementioned advantages but which also comprise primary carbamate groups. Graft materials containing mixed functional groups such as β or higher-hydroxy primary carbamate groups would be even more advantageous.

It would thus be advantageous to provide a method of grafting that would address the deficiencies of the prior art. In particular, what is desired is a method of graft polymerization that would facilitate the production of multifunctional graft materials, especially multifunctional graft polymers wherein at least one functional group comprises a primary carbamate group, especially a β or higher-hydroxyl primary carbamate group. Such improved graft material manufacturing processes would have a decreased risk of uncontrolled molecular weight growth, the loss of desired functionality on the base material, and/or gelation.

It is thus an object of the invention to provide a method of making multifunctional graft materials that eliminates the disadvantages of the prior art.

In particular, it is an object of the invention to provide a method of obtaining a graft material having at least two functional groups that would be reactive with each other under reaction, oligomerization, or polymerization conditions. That is, the at least two functional groups on the final reaction product would normally present serious challenges with respect to side reactions if incorporated via traditional reaction, oligomerization or polymerization routes.

It is another object of the invention to provide a relatively simple and commercially feasible method of making β or higher-hydroxy primary carbamate functional materials having at least one other functional group obtained through grafting reactions, most particularly at least one hydroxyl functional urethanized grafting moiety.

SUMMARY OF THE INVENTION

These and other objects have been achieved with the methods of the invention.

In one embodiment, the method of the invention provides a simple and commercially feasible way of making multifunctional materials. The term "multifunctional material" as used herein refers to compounds, oligomers, or polymers comprising a least one primary carbamate group and at least one grafting moiety (cii) per molecule on average. In a most preferred embodiment, 'multifunctional material' refers to compounds, oligomers, or polymers comprising one or more β or higher hydroxy primary carbamate groups and one or more hydroxyl functional urethanized grafting moieties (cii) per molecule on average.

It is an aspect of the method of the invention that a base material P comprising two or more cyclic carbonate groups (bi) per molecule on average must undergo two different reactions, either successively or simultaneously. More particularly, at least one of the cyclic carbonate groups on average per molecule of the base material P must undergo a reaction (A) with ammonia. At least one other cyclic carbonate group of the base material P per molecule on average must undergo a reaction (B) with a grafting material (c).

Grafting material (c) comprises at least one amine group (ci) and a grafting moiety (cii). The amine group (ci) is selected from primary amines, secondary amines, and mixtures thereof. Grafting moiety (cii) may be a material, oligomer, or polymeric in nature. Grafting moiety (cii) will generally comprise a backbone which may be aliphatic, cycloaliphatic, aromatic, unsaturated and mixtures thereof. Grafting moiety (cii) may also contain hetroatoms such as O, S, N, Si, and the like which may be in the form of ether groups, ester groups, urethane (non-primary carbamate) groups, urea groups, mixtures thereof and the like. Grafting material (c) can possess additional functional groups (cii$_{fg}$) that are not reactive towards a cyclic carbonate group under the conditions of reactions (A) or (B). Non-limiting examples of additional functional groups (cii$_{fg}$) are carbamate groups, acid groups, hydroxy groups, ethylenically unsaturated groups, ester groups, ether groups, urethane groups, urea groups and mixtures thereof.

In another embodiment, the method of the invention provides multifunctional waterborne materials, especially β or higher-hydroxy primary carbamate functional materials. In this embodiment, the at least one grafting moiety (cii) is selected from secondary amines, tertiary amines, acid groups, salted acid groups, and nonionic groups. In addition, it is an aspect of this embodiment of the invention that if the at least one grafting moiety (cii) is a secondary or tertiary amine, or if the at least one grafting moiety (cii) is an acid group and the reaction of material P with ammonia proceeds before the reaction of material P with grafting material (c), the method of the invention will further comprise reacting the grafting moiety (cii) with one or more salting agents (f) to provide a salted site (cii*) which facilitates the dispersion of the final multifunctional material into water.

The waterborne multifunctional materials of the invention will generally have the structure:

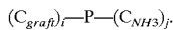

In this formula, P is a hydrocarbon-based material selected from the group consisting of compounds, oligomers, and polymers, and has a number average molecular weight $P_{MW}$. $C_{graft}$ is the reaction product of ammonia and a cyclic carbonate functional group and has at least one structure selected from the group consisting of of formulas (I), (II) and (III):

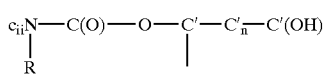

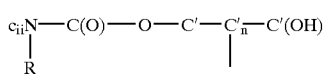

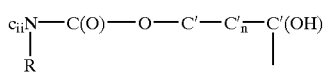

wherein C' is a saturated carbon having substituents selected from hydrogen and alkyl groups of from one to six carbons, R is hydrogen or an alkyl group of from one to six carbons, and c$_{ii}$ is a grafting moiety selected from secondary amines, tertiary amines, acid groups, salted acid groups, nonionic groups, and mixtures thereof. i and j may be the same or different and will each be a number from 1 to about 49. $C_{NH3}$ is the reaction product of ammonia with a cyclic carbonate functional group and will have a structure selected from the group of formulas (I), (II) and (III):

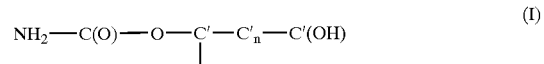

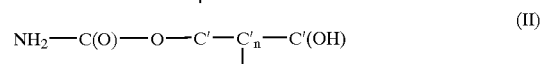

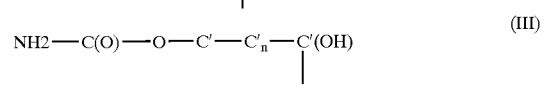

wherein C' is a saturated carbon having substituents selected from hydrogen and alkyl groups of from one to six carbons, and n is a number from 0 to 6. When $$WV_1 = P_{MW} \div (i+j) \text{ and } WV_2 = P_{MW} \div (i),$$

the waterborne multifunctional materials of the invention will be electrodepositable if $WV_1$ is a number from 500 to 2000 and $WV_2$ is a number from 320 to 1000; water dispersible if $WV_1$ is a number from 400 to 800 and $WV_2$ is a number from 450 to 1500; and water soluble if $WV_1$ is a number less than 600 and $WV_2$ is a number from 320 to 2500.

The invention further provides a method of making multiple multifunctional acrylic materials from a single precursor material or limited starting reactants. This method requires providing an ethylenically unsaturated monomer mixture (a) comprising two or more monomers (ai) having at least one cyclic carbonate group and the structure

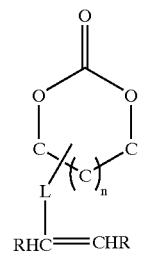

In this formula L is a linking group selected from aliphatic groups, cycloaliphatic groups, aromatic groups and mixtures thereof of from one to seven carbons, n is a number from zero to six, and R is either hydrogen or an alkyl group of from one to six carbons.

The method then requires polymerizing the monomer mixture (a) to make an acrylic backbone polymer (b) comprising two or more cyclic carbonate functional groups (bi) and then subjecting a first portion of the acrylic backbone polymer (b) to successive or simultaneous reactions of reaction (A) with a first grafting material (c) and reaction (B) with ammonia, to make a first multifunctional material of the formula:

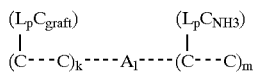 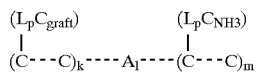

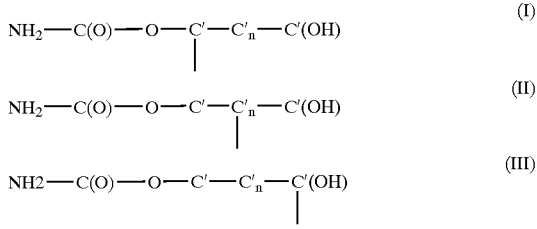

wherein A is the residue resulting from the polymerization of ethylenically unsaturated monomers which does not contain a cyclic carbonate group, L is a linking group selected from aliphatic groups, cycloaliphatic groups, aromatic groups and mixtures thereof of from one to seven carbons, and p is number of from 0 to 5.

CNH3 is the reaction product of ammonia with a cyclic carbonate functional group and will have a structure selected from the group of formulas (I), (II) and (III):

$$NH_2—C(O)—O—C'—C'_n—C'(OH) \quad (I)$$

$$NH_2—C(O)—O—C'—C'_n—C'(OH) \quad (II)$$

$$NH2—C(O)—O—C'—C'_n—C'(OH) \quad (III)$$

wherein C' is a saturated carbon having substituents selected from hydrogen and alkyl groups of from one to six carbons, and n is a number from 0 to 6.

$C_{graft}$ is the reaction product of ammonia and a cyclic carbonate functional group and has at least one structure selected from the group consisting of of formulas (I), (II) and (III):

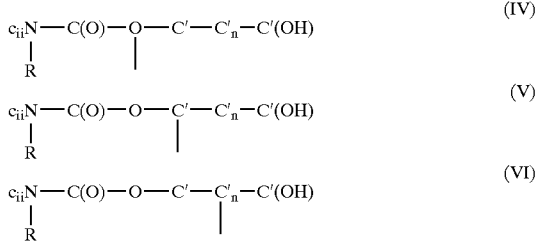

wherein C' is a saturated carbon having substituents selected from hydrogen and alkyl groups of from one to six carbons, R is hydrogen or an alkyl group of from one to six carbons, and cii is a grafting moiety selected from aliphatics, cycloaliphatics, polyurethane oligomers and polymers, non-ionic groups, polyalkyldienes, triazines, hindered amine light stabilizers, aromatic groups, ionic groups, and mixtures thereof.

k is from 1 to 95% by weight of the total sum of k, l, and m. l, is from 0 to 50% by weight of the total sum of k, l, and m, and m is from 1 to 95% by weight of the total sum of k, l, and m.

After this first multifunctional material is produced, the method requires that one or more different portions of the acrylic backbone polymer (b) be subjected to successive or simultaneous reactions of reaction (A) with different grafting materials (c) and reaction (B) with ammonia, to make multiple multifunctional material of the formula:

wherein all variables are as defined above except that cii is different for each additional multifunctional material.

The multifunctional materials made by the methods of the invention are useful as a film-forming components in curable film-forming compositions, especially curable coating compositions, whether solventborne, liquid solvent free coatings, waterborne, electrodeposition, powder, or powder slurry. Automotive applications requiring an optimum balance of finished film properties will particularly benefit from the use of the primary carbamate multifunctional materials made by the method of the invention. Finished film-properties that improve with the use of the claimed multifunctional materials include etch resistance, scratch and marring resistance, UV durability, chip resistance, adhesion, and/or the like.

DETAILED DESCRIPTION OF THE INVENTION

The method of the invention requires the successive or simultaneous reaction of a base material P with two different reactants, i.e., ammonia and a grafting material (c). Material P must comprise two or more cyclic carbonate groups (bi) per molecule on average. Thus, at least one cyclic carbonate group per molecule on average of material P must be reacted with ammonia, i.e., reaction (A). Reaction (A) will produce a β or higher hydroxy primary carbamate functional group. At least one other cyclic carbonate group per molecule of material P on average must be reacted with a grafting material (c), i.e., reaction (B) to provide a hydroxy functional urethanized graft moiety.

Reactions (A) and (B) may occur in succession relative to one another and independent of order. That is, reaction (A) may begin and go to completion prior to the initiation of reaction (B). Alternatively, reaction (B) may begin and go to completion prior to the initiation of reaction (A). In another embodiment, the two reactions may proceed and finish simultaneously. Finally, a mixture of these various reaction schedules may be used, i.e., one or the other of the two reactions may be begin prior to the other, with the other starting at some point prior to the completion of the first initiated reaction.

However, as used herein, the phrase "goes to completion" refers only to the reaction of that amount of cyclic carbonate groups intended for conversion by particular reaction (A) or (B). At a minimum, however, at least one cyclic carbonate group per molecule, on average, is reacted with each of reaction (A) and reaction (B). Thus, it is an aspect of the invention that even if either reaction (A) or (B) goes to completion prior to the initiation of the other reaction, there will always be at least one remaining cyclic carbonate group available for reaction in the second occuring reaction. That is, the method of the invention requires that both reaction (A) and (B) occur with one or more of the cyclic carbonate groups of material P on average per molecule. It is also an aspect of the invention that, when desired, there may be cyclic carbonate groups (bi) attached to material P that remain unreacted after the completion of reactions (A) and (B).

Suitable materials P are those materials that comprise two or more cyclic carbonate groups (bi) and are of the formula:

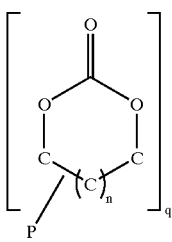

wherein q is a number from 2 to 50 and n is a number from 0 to 6, preferably from 0 to 1. Thus, illustrative cyclic carbonate groups (bi) are those cyclic carbonate groups having various ring sizes as are known in the art, such as five-membered cyclic carbonate rings, six-membered cyclic carbonate rings, seven-membered cyclic carbonate rings, or fused ring systems containing the characteristic —O—CO—O— carbonate moiety. 5-membered and 6 membered cyclic carbonate rings are preferred for use as cyclic carbonate groups (bi), with 5-membered rings being most preferred due to their commercial availability. Also, it will be appreciated that the carbons in the above cyclic carbonate structure are fully saturated with either hydrogen atoms or alkyl groups of from one to six carbons.

Material P must have at least two cyclic carbonate groups, preferably more than two, and most preferably at least 3 cyclic carbonate groups on average per molecule of material P. Thus, while it is conceivable that there may be individual molecules that contain less than two cyclic carbonate groups, on average, each molecule will have two or more. In one preferred embodiment, material P will have from 3 to 50 cyclic carbonate groups, more preferably from 3 to 20, and most preferably from 3 to 10 cyclic carbonate groups, on average per molecule of material P.

In general, material P is a hydrocarbon-based material that may or may not contain heteroatoms in those portions of material P not including cyclic carbonate group (bi) and any optional functional groups. Material P may be a compound, oligomer, polymer, or a mixture thereof. Material P may be aliphatic, cycloaliphatic, aromatic, unsaturated, saturated, and mixtures thereof and may have a number average molecular weight of from 174 to 1,000,000 Daltons. More preferably, material P having at least two cyclic carbonate groups will have a number average molecular weight of from 174 to 50,000 Daltons, most preferably from 188 to 8,000 Daltons. Preferred materials P will normally contain heteratoms. "Heteroatoms" as used herein refers to atoms other than carbon or hydrogen. Preferred heteroatoms are O, N, Si, and mixtures thereof.

For the purposes of the instant invention, the term "oligomer" refers to materials having from two to nine repeating units or mixtures of repeating units. In general, suitable oligomers for use in the instant invention will have number average molecular weights in the range of from 202 to 1499 Daltons.

"Polymer" as used herein refers to materials having at least ten repeating units, more preferably greater than 10 repeating units. In general, polymers suitable for use as material P will have a number average molecular weight in the range of from 1500 to 1,000,000 Daltons, preferably between 1500 and 50,000 Daltons, most preferably between 1500 and 15,000 Daltons.

It will be appreciated by those of skill in the art that because oligomers and polymers are both based on repeating units of monomeric materials; high molecular weight oligomers may overlap the low molecular weight end range for polymers.

"Compounds" as used herein refers to materials that do not contain two or more of the same repeating units. In general, compounds having two or more cyclic carbonate groups will have number average molecular weights in the range of from 174 to 2000.

The term "repeating units" as defined as herein refers to groups of atoms that are the reaction product result or residue of the reaction of two or more monomers. Such repeating units will generally have an individual number average molecular weight in the range of from 28 to 750 Daltons.

While material P may be a compound, an oligomer, a polymer or a mixture thereof, material P will most preferably be a polymer and/or oligomer.

In addition to the required cyclic carbonate functional groups (bi), material P may optionally comprise one or more additional functional groups (bii), different from required cyclic carbonate functional group (bi). In general, optional functional group (bii) may be defined as any reactive functional group that is essentially inert with respect to cyclic carbonate groups (bi) under the reaction conditions A and B. More preferably, optional functional group (bii) will also be reactive with a reactive functional group of a curing agent (B). In most cases, it is preferred that functional groups (bii) also be inert with respect to grafting material (c), including (ci), (cii), and any functional groups (cii$_{fg}$); and/or ammonia, under the reaction conditions A and B. Illustrative examples of optional functional groups (bii) include blocked isocyanates, hydroxy, aminoplast, ethylenically unsaturated groups, primary carbamate, and the like.

Examples of suitable oligomers and/or polymers useful as material P include the following: biurets and isocyanurates, homopolymers of diisocyanate materials such as isocyanurates, acrylic, modified acrylic, polyurethane, polyester, polylactones, polyurea, alkyd, polysiloxane, polyethers, epoxy upgrades, mixtures thereof, and the like. Oligomers and polymers preferred for use as material P are polyurethane, polyester, acrylic, and the like. Most preferred polymers and oligomers for use as material P are polyurethanes, acrylics and isocyanurates.

In one embodiment of the invention, the material P may be an acrylic. The acrylic polymer preferably has a molecular weight of 1500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, styrene, maleic anhydride, and the like as discussed below.

The required two or more cyclic carbonate functional groups (bi) can be incorporated into the ester portion of the acrylic monomer.

For example, in one preferred embodiment of the invention, the base material P may result from the use of a monomer mixture (a) that is polymerized under polymerization conditions, especially free radical polymerization conditions, to make an acrylic oligomer or polymer backbone (b).

Monomer mixture (a) is comprised of ethylenically unsaturated monomers having at least one carbon-carbon double bond that is reactive with another carbon-carbon double bond under conventional or controlled polymerization conditions. As used herein, 'polymerization' refers to oligomerization or polymerization reaction conditions wherein the temperature is between room temperature (approximately 20° C./68° F.) and no more than 180° C./356° F., more preferably from 70 to 140° C./158 to 284° F., and most preferably from 110 to 140° C./230 to 284° F. Such reaction conditions may relate to conventional polymerization reactions such as free radical polymerization as well as controlled or living polymerization reactions such as ATRP, and the like as discussed below.

In a preferred embodiment of the invention, polymerization as used herein refers to reaction conditions that are free of any catalysts that can activate an oxirane group. Illustrative examples of such oxirane activating catalysts are tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) in combination with crown ethers, tin octoate, calcium octoate, and the like.

The most preferred polymerization techniques are free radical polymerizations that may take place in solvent or water but will most preferably take place in solvent. Illustrative examples of suitable organic solvents include aromatic solvents, ketone solvents, ester solvents, ether solvents, alcoholic solvents, and combinations thereof. In a preferred embodiment of the invention, free radical polymerization reaction conditions will be used which are free of catalysts such as Lewis acids and strong sulphonic acids having a $pK_a$ of less than 2.0.

In a most preferred embodiment, free radical polymerization of ethylenically unsaturated monomers will take place in the presence of temperatures of from 80 to 140° C. an absence of any epoxy ring activating catalysts, and an absence of any water or alcohols that are reactive with cyclic carbonate functional groups under such temperatures. In a most preferred embodiment, the oligomerization or polymerization conditions will be such that at least two cyclic carbonate functional groups per molecule on average remain inert, preferably at least three or more cyclic carbonate functional groups on average per molecule, and most preferably from 3 to 50 cyclic carbonate groups on average per molecule.

Alternatively, the monomer mixture comprising the primary carbamate functional ethylenically unsaturated monomer of the invention may be polymerized using controlled or living radical polymerization processes as described by Matyjaszewski and Krysztof in Chem. Reviews, Vol. 101 pg 2921–2990 (2001), or by iniferter process as described by Kuchanov, in J. of Polymer Science, Part A: Polymer Chemistry Vol 32 pg 1557–1568 (1994), and Gaofenzi Xuebao Vol 2 pg 127–136 (2002), nitroxide-mediated polymerization as described by Zaremski, in Russian Polymer News Vol 4 pg 17–21 (1999), and Wang, in Abstracts of Papers, 224th ACS National Meeting, Boston, Mass., United States, Aug. 18–22, 2002 (2002), all of which are incorporated by reference herein.

It is an aspect of this embodiment of the invention that monomer mixture (a) comprise a monomer (ai) having at least one cyclic carbonate group and the structure:

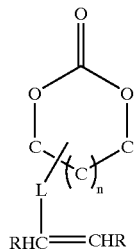

wherein L is a linking group selected from aliphatic groups, cycloaliphatic groups, aromatic groups and mixtures thereof of from one to seven carbons, n is a number from zero to six, preferably zero to one, and R is either hydrogen or an alkyl group of from one to six carbons.

L may contain heteratoms such O, N, S, and mixtures thereof and/or functional groups such as esters, ethers, urethanes, ureas, amides, and mixtures thereof. Preferred groups suitable for use as linking group L are esters and urethanes, with esters being most preferred.

Monomer (ai) will be present in monomer mixture (a) in an amount of from 1 to 100% by weight, based on the total weight of monomer mixture (a), more preferably from 5 to 90%, and most preferably from 20 to 70%, based on the total weight of monomer mixture (a). Those skilled in the art will appreciate that the requirement that material P contain on average at least two cyclic carbonate groups per molecular will necessitate the use of higher number average molecular weights for those oligomers and/or polymers of material P made from monomer mixtures having a low weight percent of monomer (ai).

Monomer (ai) can be prepared by the reaction of a glycidyl-group containing polymerization monomer with carbon dioxide to convert the oxirane group to a cyclic carbonate group. Examples of suitable oxirane group-containing polymerizable monomers include, without limitation, glycidyl acrylate, glycidyl methacrylate, glycidyl crotonate, and allyl glycidyl ether. This can be done at any pressure from atmospheric up to supercritical $CO_2$ pressures, but is preferably under elevated pressure (e.g., 60–150 psi). The temperature for this reaction is preferably 60–150° C. Useful catalysts that activate the oxirane ring may be used. Illustrative catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like.

Alternatively, cyclic carbonate functional ethylenically unsaturated monomers may be prepared by the reaction of ethylenically unsaturated monomers containing 1,2- or 1,3-diols with phosgene, dialkylcarbonates, or cyclic carbonates.

Finally, although not preferred, cyclic carbonate functional ethylenically unsaturated monomers can be prepared by the thermal decomposition of ethylenically unsaturated monomers containing beta-hydroxy primary carbamates.

Monomer mixture (a) may further optionally comprise one or more additional ethylenically unsaturated monomers (aii) that are different from monomer (ai) and have one or more functional groups that are unreactive with the cyclic carbonate functional groups of monomer (ai) under oligomerization or polymerization conditions. That is, under free radical polymerization conditions as defined above, the functional groups of monomers (aii) will not react with the cyclic carbonate group of monomer (ai). In a most preferred embodiment, monomer mixture (a) will comprise one or more monomers (aii).

Monomer (aii) will be present in monomer mixture (a) in an amount of from 0 to 99% by weight, based on the total weight of monomer mixture (a), more preferably from 30 to 95% by weight, and most preferably from 50 to 90% by weight, based on the total weight of monomer mixture (a).

Illustrative examples of such monomers (aii) include hydroxyl functional ethylenically unsaturated monomers, isocyanate functional ethylenically unsaturated monomers, carboxylic acid functional ethylenically unsaturated monomers, urea functional ethylenically unsaturated monomers, carbamate functional ethylenically unsaturated monomers and mixtures thereof, wherein ethylenically unsaturated monomers are as defined above. Preferred monomers (aii) are hydroxyl functional, acid functional, alkyl substituted, aryl substituted and isocyanate functional ethylenically unsaturated monomers Illustrative hydroxyl functional ethylenically unsaturated monomers (aii) are hydroxyalkyl esters of acrylic acid or methacrylic acid such as hydroxyethylmethacrylate, hydroxypropylmethacrylate and mixtures thereof, with hydroxyethylmethacrylate being most preferred.

Illustrative isocyanate functional ethylenically unsaturated monomers (aii) include meta-isopropenyl-alpha,alpha-dimethylbenzyl isocyanate and isocyanatoethyl methacrylate. Meta-isopropenyl-alpha,alpha-dimethylbenzyl isocyanate is most preferred.

Illustrative carboxylic acid functional ethylenically unsaturated monomers (aii) are acrylic acid, methacrylic acid and mixtures thereof, with methacrylic acid being preferred.

Suitable urea functional ethylenically unsaturated monomers (aii) include allyl urea.

Ethylenically unsaturated monomers having carbamate functionality in the ester portion of the monomer may also be used as monomer (aii). Such monomers are well known in the art and are described, for example, in U.S. Pat. Nos. 3,479,328, 3,674,838, 4,126,747, 4,279,833, and 4,340,497, the disclosures of which are hereby incorporated by reference. For example, one method of synthesis involves reaction of a hydroxy ester with urea to form the carbamyloxy carboxylate (i.e., carbamate modified acrylate). Another method of synthesis reacts an alpha, beta-unsaturated acid ester with a hydroxy carbamate ester to form the carbamyloxy carboxylate. Additionally, the hydroxy group on a hydroxyalkyl carbamate can be esterified by reaction with acrylic or methacrylic acid to form a carbamate functional ethylenically unsaturated monomer. Other methods of preparing carbamate modified acrylic monomers are described in the art and can be utilized as well.

Monomer mixture (a) may further optionally comprise one or more nonfunctional ethylenically unsaturated monomers (aiii). Illustrative nonfunctional monomers (aiii) include vinyl monomers such as styrene, alpha-methyl styrene, vinyl toluene, tert-butyl styrene, and 2-vinyl pyrrolidone and alkyl esters of acrylic acid and/or methacrylic acid. Illustrative examples of alkyl esters of acrylic acid and/or methacrylic acid include ethyl (meth)acrylate, butyl (meth)acrylate, 2-ethylhexyl(meth)acrylate, cyclohexyl (meth)acrylate, lauryl (meth)acrylate, isodecyl (meth) acrylate, methyl (meth)acrylate.

Monomer (aiii) will be present in monomer mixture (a) in an amount of from 0 to 99% by weight, based on the total weight of monomer mixture (a), more preferably from 30 to 95, and most preferably from 50 to 90, based on the total weight of monomer mixture (a).

Monomer mixture (a) will be polymerized under free radical or controlled polymerization conditions to provide an acrylic backbone polymer (b) having two or more cyclic carbonate functional groups (bi). Most preferably, free radical polymerization processes will be used. Acrylic backbone polymer (b) may also comprise optional functional groups (bii) if monomer mixture (a) comprised optional monomers (aii).

Modified acrylics having the required two or more cyclic carbonate functional groups (bi) can also be used as the material P according to the invention. Such acrylics may be polyester-modified acrylics or polyurethane-modified acrylics, as is well known in the art. Polyester-modified acrylics modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference. A non-limiting example of one such polymer is an acrylic resin made up of hydroxyethyl methacrylate, methyl methacrylate, and butyl acrylate which is then half capped with a diisocyanate such as isophorone diisocyanate to make an isocyanate functional polymer useful as material P. Cyclic carbonate groups may be incorporated into such modified acrylics via the reaction of oxirane groups and $CO_2$ to form cyclic carbonate groups as discussed above. Examples of suitable oxirane group-containing polymerizable monomers include, without limitation, glycidyl acrylate, glycidyl methacrylate, glycidyl crotonate, and allyl glycidyl ether.

Polyesters and ester oligomers having cyclic carbonate functional groups (bi) can also be used as the material P in the method of the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, 1,6-hexanediol, neopentyl glycol).

Cyclic carbonate groups may be incorporated into polyesters as follows. Polyesters, formed as described above, will generally have either hydroxy, acid or a mixture of both functionalities. Such functionalities can be used to provide the required cyclic carbonate groups (bi). For example, a hydroxy functional polyester may be reacted with a diisocyanate to form an isocyanate functional polyester. The reaction of this material with glycidol will form an epoxy functional polyester with internal urethane links with can then be reacted with $CO_2$ to form cyclic carbonate groups. Polyesters that contain 1,2 or 1,3-diols can be converted into cyclic carbonate groups by reaction with carbonates such as dimethyl carbonate or diphenyl carbonate or by reaction with cyclic carbonates such as ethylene or propylene carbonate or by reaction with phosgene. Cyclic carbonate groups can also be incorporated by the reaction of acid or hydroxy groups on the polyester with respectively, allyl alcohol or vinyl acetic acid, followed by reaction with peroxide and then carbon dioxide.

Other functional polyesters can be formed though the use of specialty capping alcohols and acids that are added during the polyester formation. For example, the addition of a hydroxy alkene followed by reaction with hydrogen peroxide will result in the placement of an epoxy group on the polyester. Reaction of this epoxy polyester with carbon dioxide will also result in the formation of a cyclic carbonate functional polyester.

Polyurethanes and urethane oligomers having required cyclic carbonate functional groups (bi) are also known in the art. They can be prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). Formulating with an appropriate amount of excess polyisocyanate will result in the polyurethane having free isocyanate functionality. Use of glycidol or 3-hydroxypropylene carbonate, for example, will functionalize the polyurethane with epoxy or cyclic carbonate groups respectively. As described above, epoxy groups can be converted into cyclic carbonate groups via reaction with $CO_2$.

Compounds suitable for use as material P include mono or polyfunctional compounds such as nonchain-extended aliphatics, cycloaliphatics, aromatics which may or may not contain heteroatoms and which contain two or more cyclic carbonate groups (bi) or functional groups which may be converted into cyclic carbonate groups.

Examples of compounds suitable for use as material P include simple aliphatic functional materials such as erythritol bis-carbonate, monomeric diisocyanates like hexane diisocyanate, aliphatic polyamines such as 1,6-hexane diamine, anhydrides such as succinic anhydride, polyacids such as dodecane dioic acid, compounds having mixed functionality such as hydroxy pivalic acid, the like, and mixtures thereof. Aromatic functional materials may also be used such as 2,2-bis(4-hydroxyphenyl)propane. Suitable heteroatom functional materials include hydroxyneopentyl hydroxy pivalate. It will be appreciated that such compounds that do not have two or more cyclic carbonates thereon do contain functional groups that can be converted into the required two or more cyclic carbonate groups as described herein.

Other examples of suitable oligomers for use as material P include heterocyclic materials based on triazines and isocyanurates such as triamino triazine and tris-glycidyl isocyanurate.

Most preferred for use as material P herein are acrylic oligomers and polymers made using the (meth)acrylate esters of glycerine carbonate or 4-hydroxymethyl-1,3-dioxan-2-one, urethanes and acrylics functionalized using hydroxy cyclic carbonates such as glycerine carbonate, and isocyanurate based oligomers such as 1,3,5-triazine-2,4,6 (1H,3H,5H)-trione.

On the average, at least one cyclic carbonate group (bi) of any material P must undergo reaction (A) with ammonia to produce a reaction product comprising material P having at least one β or higher hydroxy primary carbamate group.

It will be appreciated that the phrase "β or higher hydroxy primary carbamate group" refers to functional groups of the structure:

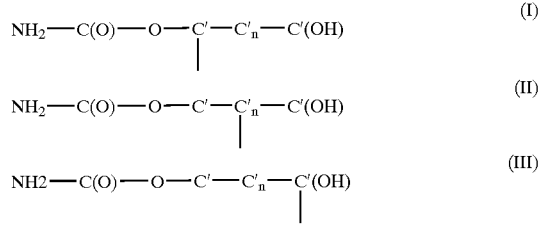

wherein C' is a saturated carbon having substituents selected from hydrogen and alkyl groups of from one to six carbons, and n is a number from 0 to 6, preferably from 0 to 4, and most preferably from 0 to 1. The term "β" or "beta" refers to the structure above when n is 0. Similarly, gamma refers to the above structure when n is 1. The value of n will be dependent upon the number of carbons in the cyclic carbonate functional group (bi).

The reaction (A) with ammonia will generally take place under mild conditions at temperatures from 0 to 60° C. It can be carried out in organic solvents such as methanol, or the reaction can be carried in water, or a mixture of water and organic solvents. When water is used as the sole solvent or as a part of a solvent blend, ammonium hydroxide may be used in place of ammonia. Alternatively, liquefied ammonia may be used as the solvent. However, it will be appreciated that the reaction with the grafting material (c) must occur first when ammonia is used as the solvent, or an excess of ammonia is used.

It will be appreciated that when the reaction with ammonia occurs before or at the same time as the reaction with the grafting material (c), great care must be used in measuring the molar amount of ammonia used to ensure that cyclic carbonate functional groups remain for reaction with grafting material (c). Under these conditions, it is preferred that solutions of ammonia in water (ammonium hydroxide) or solvent be used to facilitate greater control of the concentration of ammonia as compared to that achievable with ammonia gas.

Finally, the amount of ammonia used will be dependent upon the desired number of β and higher hydroxy primary carbamate groups present on average per molecule of final reaction product.

The method of the invention also comprises the reaction (B) of material P with at least one grafting material (c).

Grafting material (c) will be at least one material comprising at least one amine group (ci) and at least one grafting moiety (cii). Grafting material (c) may be monomeric, oligomeric, or polymeric in nature.

The at least one amine group (ci) of grafting material (c) will be at least one amine group that is selected from primary amines, secondary amines, and mixtures thereof. Primary amines are most preferred for use as the at least one amine group (ci).

That portion of grafting material (c) which is not amine group (ci) may be referred to as graft moiety (cii) and may be a material, oligomer, or polymeric in nature. Grafting moiety (cii) will generally comprise a backbone which may be aliphatic, cycloaliphatic, aromatic, unsaturated and mixtures thereof. Grafting moiety (cii) may also contain hetroatoms such as O, S, N, Si, and the like. Grafting moiety (cii) can also possess additional functional groups ($cii_{fg}$) that are not reactive towards a cyclic carbonate group under the reaction conditions A or B.

The selection of graft moiety (cii) is dependent upon the desired performance properties of the final multifunctional material of the invention. Graft moiety (cii) can be selected to provide particular properties or attributes. For example, graft moiety (cii) can be selected to provide flexibility via the introduction of long chain fatty acids. Alternatively, as discussed below, graft moiety (cii) can be selected to impart or control water dispersibility or solubility.

Illustrative graft moieties (cii) are aliphatics; cycloaliphatics; polyurethane oligomers and polymers; nonionic groups such as ether groups, polyether groups, polyoxyalkylene groups, halogen-containing groups, ester groups, polyester groups, polylactones groups; polyalkyldienes; triazines; hindered amine light stabilizers (HALS); aromatic groups; and ionic groups such as secondary amines, tertiary amines, acid groups, salted acid groups, and mixtures thereof. Most preferred graft moieties (cii) will be selected from the group of ionic groups such as acid, salted acid groups, and mixtures thereof.

Any suitable graft moiety (cii) may also contain functional groups ($cii_{fg}$) that are essentially inert with respect to cyclic carbonate groups, functional groups (bii), ammonia, and/or amine groups under the reaction conditions A and B. Illustrative examples of functional groups ($cii_{fg}$) include blocked isocyanates, hydroxy, acid, carbamate, ethers, polyethers, esters, polyesters, amines not reactable with cyclic carbonates, aminoplast, ethylenically unsaturated groups and the like.

In a most preferred embodiment, grafting material (c) will comprise such functional groups ($cii_{fg}$). Most preferred functional groups ($cii_{fg}$) are hydroxy, acid, carbamate, ethers, and polyethers.

Preferred for use as graft material (c) when making the β or higher hydroxy primary carbamate multifunctional materials of the invention are hydroxyamines such as hydroxypropyl amine, amino primary carbamates such as 3-aminopropyl carbamate, ethylenically unsaturated amines such as allylamine, halogen containing amines such as polychloro hexyl amine, nonionic amines such as amino functionalized polyethyleneoxide and aminocrotonylnitrile, silane functional amines such as aminopropyl trimethylsilane, amino acids such as 4-aminobutyric acid, and mixtures thereof. Most preferred for use as grafting material (c) are hydroxy amines, carbamate amines, amino acids, and unsaturated amines.

In a most preferred embodiment, if the at least one amine group (ci) is a primary amine, grafting moiety (cii) must have six or more carbons or have at least one additional functional group ($cii_{fg}$) such those discussed above.

In a special case, the functional group ($c_{iifg}$) may be able to form a reversible salt with another functional group in the reaction mixture as long as it does not prevent the desired reactions from occuring. Thus, primary or secondary amino acids, for example, which can form a reversible salt with themselves can be used.

In another preferred embodiment, the desired β or higher hydroxy primary carbamate multifunctional materials produced by the method of the invention will be waterborne materials. "Waterborne" as used herein refers to materials that are either water-soluble or water dispersible. A "water soluble" graft material refers to a material that is capable to mixing with water to form a homogenous mixture. A "water dispersible" graft material refers to a material that upon mixing with water forms a microscopically heterogeneous mixture of two or more finely divided phases.

To provide waterborne materials of the invention, graft moiety (cii) must be selected from the group consisting of secondary amines, tertiary amines, acid groups, salted acid groups, nonionic groups, nitrites, polyethers, polyesters, amides, ureas, and mixtures thereof, preferably from the group consisting of acid groups, salted acid groups, nonionic groups, nitrites, polyethers, amides, ureas, and mixtures thereof, and most preferably from the group consisting of acids.

However, if a multifunctional waterborne material of the invention is desired, and graft moiety (cii) comprises an ionic group such as salted acid groups, graft moiety (cii) will preferably have from one to no more than five carbons for each ionic group, preferably from one to four carbon atoms for each ionic group. If a multifunctional waterborne material of the invention is desired and the graft moiety (cii) is nonionic, graft moiety (cii) should comprise from one to no more than three carbons for each additional nonionic functional group ($cii_{fg}$).

In a most preferred embodiment of the method of the invention used to make waterborne β or higher hydroxy primary carbamate multifunctional materials, certain relationships between the selection of the amine group (ci) and grafting moiety (cii) will be observed. When the grafting moiety (cii) is a secondary amine, the amine group (ci) will be a primary amine. When the grafting moiety (cii) is a tertiary amine, the amine group (ci) will be either a primary amine or secondary amine. If the grafting moiety (cii) is an acid, salted acid, or nonionic, the amine group (ci) will be either a primary amine or secondary amine.

Thus, certain grafting materials (c) are preferred when making waterborne β or higher hydroxy primary carbamate multifunctional materials of the invention. For example, illustrative examples of polyamines suitable for use as graft material (c) in this embodiment include dimethylamino butylamine. Suitable amino acids useful as graft material (c) include aminobutyric acid, and the salted versions thereof. Salted forms of suitable acid groups may be obtained via reaction with ammonia or amines such as triethyl amine. Illustrative examples of graft materials (c) containing nonionic groups include amine functionalized polyethylene oxides and propylene oxides, and nitrites such as aminocrotonylnitrile.

Grafting material (c) will be provided in the method of the invention in an amount sufficient to react with from 1 to 99% of the total number of cyclic carbonate functional groups (bi), more preferably from 5 to 90% and most preferably from 5 to 20% of the total number of cyclic carbonate functional groups (bi). The minimum and maximum percent listed above is dependant on the number average molecular weight of the material P in order to maintain the requirement that the final multifunctional material contains at least one beta or higher hydroxy primary carbamate group and at least one graft moiety (cii).

It will be appreciated that additional grafting material (c) may be added based on other functional groups (bii) present on any material P in those cases wherein functional groups (bii) are not inert with respect to grafting material (c). For example, grafting material (c) may be used to react with acid groups to provide water dispersible ionic groups.

An additional reaction (C) may optionally be added to the method of the invention used to make waterborne β or higher hydroxy primary carbamate multifunctional materials. Reaction (C) may be used to salt any saltable moieties present in grafting moiety (cii) to provide water dispersible groups. One or more salting agents (f) may be reacted with any grafting moiety (cii) that are saltable to make a salted site (cii*). Examples of saltable grafting moieties (cii) are secondary amines, tertiary amines, acid groups, and mixtures thereof. Illustrative salting agents (f) include organic acids such as lactic acid and acidic acid, organic bases such as triethyl amine and aminopropanol, inorganic acids based on halides, phosphorous and sulfur and bases such as metal hydroxides. It will be appreciated that salting agents (f) may be used in any desired amount to obtain the desired level of water dispersibility.

Depending upon the selection of grafting moiety (cii), reaction (C) may be required to obtain a waterborne β or higher hydroxy primary carbamate multifunctional materials of the invention. In general, if a waterborne final product is desired, when (i) the at least one grafting moiety (cii) is a secondary amine or a tertiary amine, or (ii) the at least one grafting moiety (cii) is an acid group and the reaction of material P with ammonia proceeds before the reaction of material P with grafting material (c), the method of the invention will require further reacting the grafting moiety (cii) with one or more salting agents (f) to provide a salted site (cii*).

If material P is an acrylic and the grafting material (c) is not provided during the free radical polymerization of a monomer mixture (a), grafting material (c) will be reacted with acrylic backbone polymer (b) under reaction conditions sufficient to react the amine group (ci) of grafting material (c) with the cyclic carbonate functional group (bi) of acrylic backbone polymer (b).

Illustrative grafting reaction conditions are temperatures between 0 to 140° C., more preferably between 0 and 120° C., and most preferably between 0 and 60° C.

In one embodiment of the invention, optional functional groups (bii) of acrylic backbone polymer (b) may be reacted with one or more optional compounds (d) to provide a functional group (bii'). The reaction between functional groups (bii) and optional compound (d) may occur before, during or after the reaction of grafting material (c) and material P. Most preferably, if optional functional groups (bii) are used as a precursor to desired functional group (bii'), such reactions may occur before or after reactions A and B, most preferably after the completion of reactions A and B. Functional group (bii) may thus act as a secondary-grafting site or as a precursor to a different functional group that was difficult to incorporate earlier. For example, a material P containing acid functional groups (bii) may be salted with a tertiary amine before the initiation of reaction A or B.

Compound (d) may be monomeric, oligomeric, or polymeric in nature, with monomeric being most preferred. It will be appreciated that compound (d) must have at least one functional group reactive with optional functional group (bii). The selection of compound (d) will be dependent upon the identity of both functional groups (bii) and (bii'). Illustrative compounds include those discussed below with respect to compounds (e).

It will be appreciated that the reaction of the at least one amine group (ci) of the grafting material (c) and the cyclic carbonate group (bi) of the acrylic backbone polymer (b) results in the formation of a urethane group and a hydroxyl group beta or higher to the urethane group. The urethane group links the grafting moiety (cii) with the acrylic backbone polymer (b).

In another embodiment of the invention some, all, or none of the hydroxyl groups formed from either the reaction of the cyclic carbonate functional group (bi) and the amine group (ci) or ammonia may be reacted with one or more compounds (e).

Compounds (e) may be monomeric, oligomeric, or polymeric in nature. Suitable compounds (e) include those compounds that have at least one functional group reactive with hydroxyl. In another embodiment, the one or more compounds (e) may comprise compounds or groups such as those described above in regards to grafting moiety (cii). It will therefore be appreciated that the hydroxyl group may act as a secondary-grafting site. Alternatively, the hydroxyl group may be converted into a different functional group that could not easily be introduced previously. For example, the hydroxyl group may be reacted with a mono- or polyisocyanate compound to provide an isocyanate functional urethanized acrylic graft polymer. Alternatively, the hydroxyl group may be converted into an acid group by reaction with a cyclic anhydride. Finally, the hydroxyl group may also be converted to a carbamate group by reaction with phosgene and ammonia.

Thus, additional multifunctionality may be incorporated into the urethanized graft materials of the invention via reaction of the hydroxyl groups resulting from said amine/cyclic carbonate reaction with compounds (e) or by the use of optional functional groups (bii) or by reaction of functional groups (bii) with compounds (d).

The use of the method of the invention provides an improved way to make multifunctional graft materials that were not previously commercially feasible to manufacture. For example, with the use of the method of the invention, urethanized graft materials having blocked isocyanate or urethane containing groups and hydroxyl groups can be obtained.

As discussed previously, the method of the invention allows for the simultaneous or successive reactions of reactions (A) and (B) with the two or more cyclic carbonate functional groups (bi) of material P.

However, if material P is an acrylic, grafting material (c) and ammonia may be provided during the polymerization of monomer mixture (a) or after, but will most preferably be provided after the acrylic backbone (b) is obtained. If grafting material (c) or ammonia is provided during the polymerization of monomer mixture (a) so that grafting occurs simultaneously with polymerization, grafting material (c) must be free of any carbon-carbon double bonds which could polymerize when subjected to polymerization conditions.

It will also be appreciated that the multifunctional materials of the invention can be designed to have a wide range of hydroxyl and/or acid values. The graft materials of the invention may be used in solventborne, solventless liquid, waterborne including electrodeposition coatings, or powder coating compositions.

The method of the invention will generally provide β or higher hydroxy primary carbamate multifunctional materials of the formula:

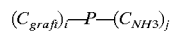

wherein P is a material, oligomer, or polymer as discussed above, $C_{graft}$ is the reaction product of graft material c and a cyclic carbonate functional group (bii), $C_{NH3}$ is the reaction product of ammonia with a cyclic carbonate functional group (bii), and i and j represent the total number of both functional groups.

P is defined as above except that in this formula, P may, but is not required to, contain two or more cyclic carbonate groups (bi) but may further comprise additional functional groups (bii) that are inert with respect to cyclic carbonate functional groups (bii) under the reaction conditions of A and B.

$C_{graft}$ is the reaction product of graft material c discussed above and a cyclic carbonate functional group. $C_{graft}$ will have a structure selected from the group of formulas (I), (II) and (III):

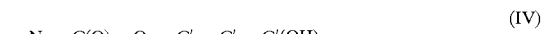

(IV)

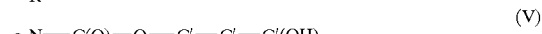

(V)

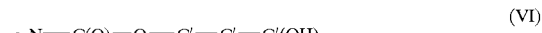

(VI)

wherein C' is a saturated carbon having substituents selected from hydrogen and alkyl groups of from one to six carbons, R is hydrogen or an alkyl group of from one to six carbons, and $c_{ii}$ is a grafting moiety as described above.

i and j represent the total number of the respective functional groups and may be the same or different, but will most preferably be different. i is a number from 1 to about 49, preferably from 1 to 20 and most preferably from 1 to 10, while j is a number from 1 to about 49, preferably from 1 to 30 and most preferably from 1 to 10.

$C_{NH3}$ is the reaction product of ammonia with a cyclic carbonate functional group and will have a structure selected from the group of formulas (I), (II) and (III):

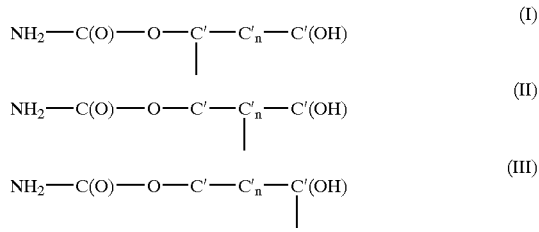

wherein C' is a saturated carbon having substituents selected from hydrogen and alkyl groups of from one to six carbons, and n is a number from 0 to 6, preferably from 0 to 4, and most preferably from 0 to 1.

In a particularly preferred embodiment of the invention, P will be an acrylic oligomer or polymer. In this embodiment, the β or higher hydroxy primary carbamate acrylic multi-functional materials of the invention will have the formula:

wherein A is the residue resulting from the polymerization of an ethylenically unsaturated monomer which does not contain a cyclic carbonate group but may contain a functional group (bii), L is a linking group, p is number of from 0 to 5, $C_{graft}$ is the reaction product of graft material c and a cyclic carbonate functional group as discussed above, $C_{NH3}$ is the reaction product of ammonia with a cyclic carbonate functional group as discussed above, and k, l, and m represent the total number of monomers or repeating units. It will be appreciated that in the above formula, the bond connecting L to the ethylenically unsaturated backbone is not attached to either carbon but is depicted as somewhere in the middle to illustrate the two possible isomers.

Ethylenically unsaturated monomers suitable for providing repeating units A may be as described above with respect to ethylenically unsaturated monomers (aii) and (aiii).

L is a linking group selected from aliphatic groups, cycloaliphatic groups, aromatic groups and mixtures thereof of from one to seven carbons. L may contain heteratoms such O, N, S, and mixtures thereof and/or functional groups such as esters, ethers, urethanes, ureas, amides, and mixtures thereof. Preferred groups suitable for use as linking group L are esters and urethanes, with esters being most preferred.

p is number of from 0 to 5, with numbers of from 1 to 5 being preferred and 1 being most preferred. It will thus be appreciated that L is an optional linking group but one which will preferably be present.

$C_{graft}$ and $C_{NH3}$ are as defined above.

k, l, and m represent the total number of monomers comprising the desired β or higher hydroxy primary carbamate functional acrylic polymer or oligomer of the invention. k is from 1 to 95% of the total sum of k, l, and m, preferably from 5 to 80 and most preferably from 20 to 50, based on the total sum of k, l, and m. l is from 0 to 98% of the total sum of k, l, and m, preferably from 30 to 95%, and most preferably from 50 to 90%, based on the total sum of k, l, and m. m is from 1 to 95% of the total sum of k, l, and m, preferably from 5 to 80 and most preferably from 20 to 60, based on the total sum of k, l, and m When the method of the invention is used to provide waterborne β or higher primary carbamate functional materials, the values of i and j in the formula:

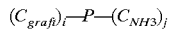

may be useful in predicting the degree of water solubility. That is, as noted above, materials useful in waterborne compositions may range from completely water soluable to those which are relatively insoluable but which are stabilized in water by the formation of micelles via dispersible functional groups. As noted above, i and j represent the total number of the respective functional groups.

Combined with number average molecular weight of P, the values of i and j may be used as a guide to predict the water dispersibility or solubility of the resulting β or higher hydroxy primary carbamate functional material. For example, when the result of dividing the molecular weight of material P by the sum of i+j is between 500 and 2000, and when the result of dividing the molecular weight of material P by just i is between 320 to 1000, the waterborne multifunctional materials of the invention may be suitable for use in electrodeposition coating compositions wherein the multifunctional material is initially dispersible in waterborne but precipitates out upon the introduction of an electrical current. Alternatively, when the result of dividing the molecular weight of material P by the some of i+j is between 400 and 800, and the result of dividing the molecular weight of material P by i is between 450 to 1500, the waterborne multifunctional materials of the invention may be described as suitable for use in aqueous dispersions. Finally, when the result of dividing the molecular weight of material P by the sum of i+j is less than 600, and the result of dividing the molecular weight of material P by i is between 320 to 2500, the waterborne multifunctional materials of the invention may be described as materials which are substantially soluble in water. However, it will be appreciated that the behavior of the multifunctional materials in water is also dependent upon the nature of material P as well as the polar/ionic nature of graft moiety (cii).

More precisely, it may be stated that the water dispersibility and/or solubility of the waterborne multifunctional materials of the invention may be identifiable based on two values calculated using i, j, and the number average molecular weight of P ($P_{MW}$), i.e., $WV_1$ and $WV_2$ wherein $$WV_1 = P_{MW} \div (i+j) \text{ and } WV_2 = P_{MW} \div (i).$$

It may be generally stated that waterborne multifunctional material of the invention will be electrodepositable if $WV_1$ is a number from 500 to 2000 and $WV_2$ is a number from 320 to 1000; water dispersible if $WV_1$ is a number from 400 to 800 and $WV_2$ is a number from 450 to 1500; and water soluble if $WV_1$ is a number less than 600 and $WV_2$ is a number from 320 to 2500.

It will be appreciated that the amounts of ammonia and different grafting materials (c) may be varied to selectively determine the water dispersibility or solubility of waterborne materials by controlling the result values of i and j as discussed above. The relative ratio of i and j needed to achieve a set level of water solubility is dependent on the make up of P, grafting material c and the overall molecular weight, and must be determined on a case by case bases. However, the foregoing values are illustrative of preferred embodiments.

The method of the invention can be also used to provide an improved method of manufacturing a number of different multifunctional acrylic oligomers or polymers. For example, a coating manufacturer producing a large number of acrylic based products having different functionalities can now produce a single large batch or "masterbatch" of a cyclic carbonate functional acrylic oligomer or polymer. It will be appreciated that the production and storage of a large volume of a single material increases efficiency and allows for economies of scale. Various acrylic based products having different functional groups can then be obtained using the method of the invention.

For example, a first portion of the masterbatch of cyclic carbonate functional acrylic material may be reacted with ammonia and a grafting material (c) such as a fatty amine to provide a resin that is usable for solvent borne flexible clearcoats. A second portion of the masterbatch may be reacted with ammonia and a different grafting material (c) such as a primary aminoacid that can be salted to provide a waterborne material useful in electrodeposition coating compositions. A third portion of the masterbatch of cyclic carbonate functional acrylic material may be reacted with sufficient amounts of ammonia and a grafting material (c) such as an amine functional polyethylene oxide oligomer to provide a 100% water soluble material useful in waterborne basecoats. A fourth portion of the masterbatch may be reacted with sufficient amounts of ammonia and a grafting material (c) such as an amino functional polyurethane to provide a fil-forming binder suitable for use in anti-chip coatings and primers.

The urethanized and β or higher hydroxyl primary carbamate multifunctional materials of the invention are particularly suitable for use in automotive coating compositions, especially electrodeposition coatings, primers, topcoats, basecoats, and/or clearcoats, with clearcoats being especially preferred.

Coating compositions comprising the multifunctional materials of the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When such coating compositions are used as topcoat coatings, they preferably have a 20 degree gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating.

Coating compositions comprising the multifunctional materials of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like.

In a preferred embodiment, the coating composition of the present invention is the clearcoat of a color-plus-clear composite coating. The clearcoat may be applied over a color coat according to the invention or may, alternatively, be applied over a color coat of a formulation already known in the art. Pigmented color coat or basecoat compositions for such composite coatings are well known in the art and do not require explanation in detail herein. Polymers known in the art to be useful in basecoat compositions include acrylics, vinyls, polyurethanes, polycarbonates, polyesters, alkyds, and polysiloxanes. Such basecoats may comprise the acrylic graft copolymer of the invention. Preferred polymers include acrylics and polyurethanes, especially the multifunctional materials of the invention. In one preferred embodiment of the invention, the basecoat composition also utilizes a β or higher hydroxy primary carbamate multifunctional material of the invention.

Curable coating compositions comprising the multifunctional materials of the invention will be crosslinkable and will thus comprise one or more type of crosslinking agents having one or more crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, and acetoacetate groups. Preferred crosslinking agents will have crosslinkable functional groups that include hydroxy functional groups and amino functional groups and isocyanate groups. Di- and/or polyisocyanates and/or aminoplast resins are most preferred for use as crosslinking agents in coating compositions comprising the acrylic graft polymer of the invention. Other mixed crosslinkers may also be used.

For example, basecoat-coating compositions comprising the multifunctional materials of the invention may require two or more separate crosslinking agents in order to react with both the primary carbamate group and the functional groups of the graft moiety (c). For example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may be incorporated into the coating composition. The amount of these materials used must be controlled to achieve the desired performance properties and/or to avoid adversely affecting the coating characteristics.

It will be appreciated that suitable solvents include organic solvents, water, water-soluble solvents, and mixtures thereof. It will be appreciated that solvent borne coating may comprise minor amounts of water while waterborne coatings such as electrodeposition coatings may comprise organic solvents.

Coating compositions can be coated onto an article by any of a number of techniques well known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

Coating compositions comprising the multifunctional materials of the invention are preferably subjected to conditions so as to cure the coating layers. Although various methods of curing may be used, thermal curing is preferred. Generally, thermal curing is effected by exposing the coated article to elevated temperatures provided primarily by radiative heat sources. Curing temperatures will vary depending on the particular blocking groups used in the crosslinking agents, however they generally range between 93 degree C. and 177 degree C. In a preferred embodiment, the cure temperature is between 135 degree C. and 165 degree C. In another preferred embodiment, a blocked acid catalyst is included in the composition and the cure temperature is between 115 degree C. and 140 degree C. In a different preferred embodiment, an unblocked acid catalyst is included in the composition and the cure temperature is between 80 degree C. and 100 degree C. The curing time will vary depending on the particular components used and physical parameters, such as the thickness of the layers. Typical curing times range from 15 to 60 minutes, and preferably 15–25 minutes at the target temperature.

PROPHETIC EXAMPLES

Example 1

Preparation of an Acrylic Backbone Polymer (P) According to the Invention

A solution of 25.58 parts of amyl acetate is heated under an inert atmosphere to reflux (~144° C./291° F.). The inert air is then turned off and a mixture of 49.0 parts of (2-Oxo-1,3-dioxolan-4-yl)methyl methacrylate, 6.1 parts of methyl methacrylate, 6.1 parts of butyl acrylate and 8.5 parts of a 50% solution of t-butylperacetate in odorless mineral spirits is added over three hours while keeping the system at reflux. Then 4.72 parts of amyl acetate is added. The final resin will have a NV of about 63.3%

Example 2

Preparation of an Acrylic Graft Beta or Greater Hydroxy Primary Carbamate Polymer According to the Invention for Use in Powder Coatings To a stirred solution of 50 parts of the product from Example 1 is added 29.3 parts of a 20% water solution of aminopropanol. The reaction is followed by amine titration. When more than 95% of the amine is consumed, 20 parts of concentrated ammonium hydroxide solution is added. The reaction is followed by infrared spectroscopy. Once all of the cyclic carbonate groups are consumed, the excess ammonia and solvent are removed by vacuum distillation. The final 100% NV resin can be used for formulating powder coatings will have Mn of greater than 1700 Daltons, a primary carbamate equivalent weight of about 605 g/equ, and a hydroxy equivalent weight of about 306 g/equ.

Example 3

Preparation of an Acrylic Graft Beta or Greater Hydroxy Carbamate Polymer According to the Invention for Use in Electrodeposition Coatings To a stirred solution of 50 parts of the product from example one is added 2.1 parts of aminobutanoic acid and 50 parts of methanol. The reaction mixture is then heated to 55° C. and followed by GC analysis Once more than 95% of the amino acid is consumed, the reaction temperature is cooled to 20° C. and ammonia gas is bubbled into the reaction mixture. The reaction is followed by infrared spectroscopy. Once all of the cyclic carbonate groups are consumed, the excess ammonia and solvent are removed by vacuum distillation. The resin, which can be used in electrodeposition coatings, will have a primary carbamate equivalent weight of about 321 g/equ, hydroxy equivalent weight of about 272 g/equ, and an acid equivalent weight (not including the weight of the salting group) of about 1815 g/equ.

Example 4

Preparation of an Oligomeric Graft Beta or Greater Hydroxy Carbamate Polymer According to the Invention for Use in Water-Soluble Coatings To a stirred solution of 50 parts of 1,3,5-Triazine-2,4,6 (1H,3H,5H)-trione and 50 parts of methanol are added 70 parts of Jeffamine XTJ-505 (a polyoxylamine from Huntsman Chemical Corporation, Houston Tex.). The reaction is stirred at room temperature and followed by amine titration until over 95% of the amine has been consumed. Then ammonia gas is bubbled into the reaction mixture. The reaction is followed by infrared spectroscopy. Once all of the cyclic carbonate groups are consumed, the excess ammonia and solvent are removed by vacuum distillation. The resin, which can be used for water-based coatings will have an approximate primary carbamate equivalent weight of 533 g/equ, a hydroxy equivalent weight of 207 g/equ. Each oligomer will contain, on average, 10 polyether units connected to the trimer by an urethane link.

Example 5

Preparation of an Urethane Based Resin Backbone (P) According to the Invention

A solution of 30 parts of anhydrous methyl ethyl ketone and 50 parts of N3300 (an aliphatic polyisocyanate based on hexanediisocyanate from Bayer, Pittsburgh, Pa.), and 0.07 parts of dibutyl tin dilaurate is heated under an inert atmosphere to 60° C. Then 33.2 parts of 4-hydroxymethyl 1,3-dioxane-2-one is added over an one hour period. The reaction temperature during the addition is allowed to increase to 70° C. After the addition, the reaction mixture is held at 70° C. until all of the hydroxy functional six member cyclic carbonate has been incorporated. Then 10 parts of i-butanol are added and the reaction held at 70° C. for an additional hour. The final resin will have a NV of approximately 68% and a cyclic carbonate equivalent weight of 333 g/equ (on NV)

Example 6

Preparation of an Urethane Polymer According to the Invention for Use in Solvent Based Coatings To a solution of 50 parts of the urethane from example 5 and 40 parts of methanol is added 6.8 parts of dodecyl amine. The reaction is followed by amine titration. Once more than 97% of the amine has been reacted, ammonia gas is bubbled into the solution. The reaction is followed by infrared spectroscopy. Once all of the cyclic carbonate groups are consumed, the excess ammonia and solvent are removed by vacuum distillation. The final product, useful in etch resistant flexible solvent borne coatings will have a primary carbamate equivalent weight of about 641 g/equ and a hydroxy equivalent weight of about 410 g/equ.

We claim:

1. A method of making two or more different multifunctional acrylic materials, the method comprising providing an ethylenically unsaturated monomer mixture (a) comprising two or more monomers (ai) having at least one cyclic carbonate group and the structure

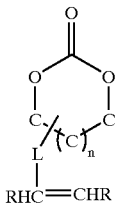

wherein L is a linking group selected from aliphatic groups, cycloaliphatic groups, aromatic groups and mixtures thereof of from one to seven carbons, n is a number from zero to six, and R is either hydrogen or an alkyl group of from one to six carbons, wherein at least one monomer (ai) is an acrylic monomer, polymerizing the monomer mixture (a) to make an acrylic backbone polymer (b) comprising two or more cyclic carbonate functional groups (bi), subjecting a first portion of the acrylic backbone polymer (b) to successive or simultaneous reactions of reaction (A) with a first grafting material (c) comprising at least one amine group (ci) and at least one grafting moiety, and reaction (B) with ammonia, to make a first multifunctional material of the formula:

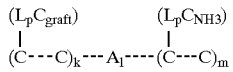

wherein

A is the residue resulting from the polymerization of ethylenically unsaturated monomers which do not contain a cyclic carbonate group, L is a linking group selected from aliphatic groups, cycloaliphatic groups, aromatic groups and mixtures thereof of from one to seven carbons, p is number of from 0 to 5, $C_{NH3}$ is the reaction product of ammonia with a cyclic carbonate functional group and will have a structure selected from the group of formulas (I), (II) and (III):

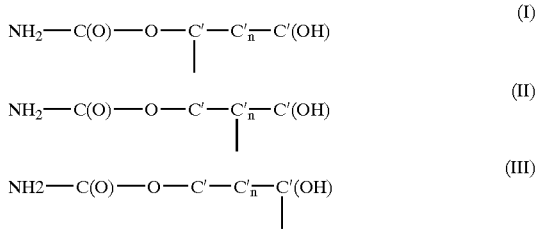

wherein C' is a saturated carbon having substituents selected from hydrogen and alkyl groups of from one to six carbons, and n is a number from 0 to 6, and $C_{graft}$ is the reaction product of ammonia and a cyclic carbonate functional group and has at least one structure selected from the group consisting of formulas (IV), (V), and (VI):

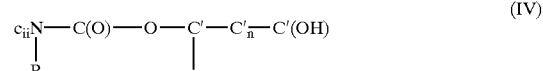

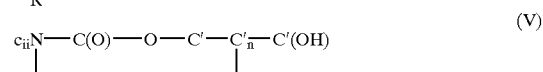

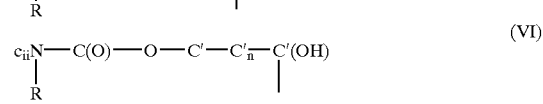

wherein C' is a saturated carbon having substituents selected from hydrogen and alkyl groups of from one to six carbons, R is hydrogen or an alkyl group from one to six carbons, and $c_{ii}$ is a grafting moiety selected from aliphatics, cycloaliphatics, polyurethane oligomers and polymers, nonionic groups, polyalkyldienes, triazines, hindered amine light stabilizers, aromatic groups, ionic groups, and mixtures thereof, k is from 1 to 95% by weight of the total sum of k, l, and m, l is from 0 to 98% by weight of the total sum of k, l, and m, and m is from 1 to 95% by weight of the total sum of k, l, and m, and subjecting one or more portions of the acrylic backbone polymer (b) to successive or simultaneous reactions of reaction (A) with at least one additional grafting material that is different from the grafting material (c) and reaction (B) with ammonia, to make multiple multifunctional material of the formula:

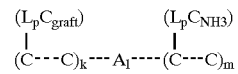

wherein all variables are as defined above except that $c_{ii}$ is different for each multifunctional material.

2. The method of claim 1 wherein monomer mixture (a) further comprises ethylenically unsaturated functional monomer (aii).

3. The method of claim 1 wherein monomer (aii) is present in monomer mixture (a) in an amount of from 1 to 100% by weight, based on the total weight of monomer mixture (a).

4. The method of claim 1 wherein monomer (aii) is present in monomer mixture (a) in an amount of from 20 to 70%, based on the total weight of monomer mixture (a).

5. The method of claim 1 wherein monomer mixture (a) further comprises ethylenically unsaturated functional monomer (aii) selected from the group consisting of hydroxyl functional ethylenically unsaturated monomers, isocyanate functional ethylenically unsaturated monomers, carboxylic acid functional ethylenically unsaturated monomers, urea functional ethylenically unsaturated monomers, carbamate functional ethylenically unsaturated monomers, and mixtures thereof.

6. The method of claim 1 wherein monomer mixture (a) further comprises ethylenically unsaturated nonfunctional monomer (aiii).

7. The method of claim 6 wherein monomer mixture (a) further comprises ethylenically unsaturated nonfunctional monomer (aiii) selected from the group consistinf of styrene, alpha-methyl styrene, vinyl toluene, tert-butyl styrene, 2-vinyl pyrrolidone, alkyl esters of acrylic acid and/or methacrylic acid.

8. The method of claim 6 wherein monomer (aiii) is present in monomer mixture (a) in an amount of from 0 to 99% by weight, based on the total weight of monomer mixture (a).

9. The method of claim 8 wherein monomer (aiii) is present in monomer mixture (a) in an amount of from 50 to 90% by weight, based on the total weight of monomer mixture (a).

10. The method of claim 1 wherein the free radical polymerization occurs (1) in temperatures of no more than 180 degrees C, (2) in the absence of epoxy catalysts, and (3) in the absence of catalysts such as Lewis acids and sulphonic acids having a pKa of less than 2.0.

11. The method of claim 1 wherein the step of polymerizing monomer mixture (a) makes an acrylic backbone polymer (b) further comprising one or more functional groups (bii) which are unreactive with the cyclic carbonate groups (bi) under free radical polymerization conditions.

12. The method of claim 11 wherein the functional group (bii) of acrylic backbone polymer (b) are selected from the group consisting of hydroxyl groups, isocyanate groups, epoxy groups, carboxylic acid groups, carbamate groups, urea groups, and mixtures thereof.

13. The method of claim 11 further comprising reacting the one or more functional groups (bii) with one or more compounds (d) to provide a functional group (bii').

14. The method of claim 13 wherein said reaction between functional groups (bii) and compound (d) occurs before the reaction of the at least one amine group (ci) of the grafting material (c) with the cyclic carbonate functional groups (bi) to make an acrylic graft polymer.

15. The method of claim 1 wherein the monomer (ai) has the structure

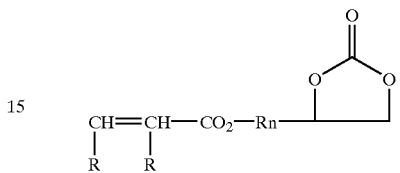

wherein Rn is a straight chain alkane of from 1 to 4 carbons, and R is H or $CH_3$.

16. The multifunctional acrylic materials of claim 1.

17. Curable coating compositions comprising the multifunctional acrylic materials of claim 16.

* * * * *